US008924127B2

(12) United States Patent
Cadman et al.

(10) Patent No.: US 8,924,127 B2
(45) Date of Patent: Dec. 30, 2014

(54) ENGINE CONTROL SYSTEM

(75) Inventors: Kristen D. Cadman, Dubuque, IA (US); Elizabeth H. Steenbergen, Gilbert, AZ (US); Steve G. Fleischmann, Dubuque, IA (US); Dennis P Reiter, Dubuque, IA (US)

(73) Assignee: Deere & Company, Moline, IL (US)

( * ) Notice: Subject to any disclaimer, the term of this patent is extended or adjusted under 35 U.S.C. 154(b) by 1088 days.

(21) Appl. No.: 12/866,343

(22) PCT Filed: Mar. 10, 2008

(86) PCT No.: PCT/US2008/056401
§ 371 (c)(1),
(2), (4) Date: Nov. 23, 2010

(87) PCT Pub. No.: WO2009/114004
PCT Pub. Date: Sep. 17, 2009

(65) Prior Publication Data
US 2011/0184627 A1 Jul. 28, 2011

(51) Int. Cl.
*B60T 7/12* (2006.01)
*F02D 11/10* (2006.01)
*F02D 41/14* (2006.01)

(52) U.S. Cl.
CPC ...... *F02D 11/105* (2013.01); *F02D 2200/0404* (2013.01); *F02D 2250/26* (2013.01); *F02D 2041/1433* (2013.01)
USPC ............................ 701/103; 701/114; 123/336

(58) Field of Classification Search
USPC ............... 701/103, 114, 115; 123/336, 339.1, 123/339.19
See application file for complete search history.

(56) References Cited

U.S. PATENT DOCUMENTS

| | | | | |
|---|---|---|---|---|
| 6,308,124 | B1 | 10/2001 | Kresse | |
| 7,010,417 | B2 | 3/2006 | Edwards | |
| 7,284,769 | B2 * | 10/2007 | Breed | 280/735 |
| 7,832,762 | B2 * | 11/2010 | Breed | 280/735 |
| 2004/0193350 | A1 | 9/2004 | Pirotais | |

FOREIGN PATENT DOCUMENTS

| | | |
|---|---|---|
| GB | 932404 | 7/1963 |

OTHER PUBLICATIONS

Written Opinion for PCT/US2008/056401, dated Sep. 23, 2010. (6 pages).

* cited by examiner

*Primary Examiner* — John Kwon
(74) *Attorney, Agent, or Firm* — Faegre Baker Daniels LLP

(57) ABSTRACT

A ground engaging vehicle including a frame, an engine, a controller, an accelerator, a position sensor and an interpreter. The engine is supported by the frame and the engine includes a throttle. The controller is in communication with the engine. The position sensor is associated with the accelerator. The position sensor generates a first signal corresponding to a position of the accelerator. The interpreter receives the first signal from the position sensor and generates a second signal dependent upon the first signal. The interpreter communicates the second signal to the controller.

23 Claims, 5 Drawing Sheets

ENGINE CONTROL SYSTEM

FIELD OF THE INVENTION

The present invention relates to an engine control system, and, more particularly, to an engine control system having a signal interpreter.

BACKGROUND OF THE INVENTION

Construction equipment utilize a power source such as a diesel engine to provide power to move the construction equipment from location to location and to power the systems thereon. One of the systems generally associated with a piece of construction equipment is a hydraulic system that supplies hydraulic fluid under pressure, as directed by an operator, to various operational components on the equipment. The hydraulic system includes a hydraulic pump that is driven by the engine. The pump reflects a load onto the engine based upon the demand of the hydraulic fluid during operation of the equipment. If the engine is operating at a very low rpm the available pressure and volume from the pump may be diminished. To increase the pressure and/or volume the engine rpm is increased to provide more available power to the hydraulic system. Most hydraulic systems involve fluid drawn from a reservoir by a pump and is forced through a shifted valve into an expandable chamber of a cylinder, which communicates with the work piece, ultimately performing useful work. The hydraulic fluid is typically returned from the work cylinder to the reservoir when the cylinder is retracted.

The engine of the construction equipment includes a throttle that is under the control of the operator either directly or indirectly. A direct linkage of the throttle to an operator control allows the operator to mechanically reposition the throttle to alter the speed of the engine. The speed of the engine is subject to the load placed thereon either directed mechanically or by way of the hydraulic and/or electrical systems. In the case of an indirect control the engine system may be under the control of an engine control system that reads the operator input, interprets the input and actuates the throttle and/or other elements of the engine to thereby alter performance of the engine based upon needs of the construction equipment as directed by the operator. The engine control system is responsive to the needs of the various loads placed upon the engine and may even include a priority in which certain elements may receive power to the determent of others in the event that the engine is incapable of providing sufficient power to meet all needs. This is known as load shedding where the engine control system sheds some of the load when it anticipates an insufficient output from the engine to meet the load requirements. The engine control system depends upon a prediction of the engine load and such prediction methods can result in incorrect actions when certain transient scenarios occur, such as when the difference between the command engine speed and actual engine speed are large due to a difference in the response characteristics of the throttle and the engine. A problem often encountered is that systems may be inappropriately shed to unload the engine when a transient scenario occurs.

What is needed in the art is an improved engine control system that can compensate for transient scenarios.

SUMMARY OF THE INVENTION

The present invention provides an engine control system for a ground engaging vehicle with a signal interpreter therein.

The invention in one form is directed to a ground engaging vehicle including a frame, an engine, a controller, an accelerator, a position sensor and an interpreter. The engine is supported by the frame and the engine includes a throttle. The controller is in communication with the engine. The position sensor is associated with the accelerator. The position sensor generates a first signal corresponding to a position of the accelerator. The interpreter receives the first signal from the position sensor and generates a second signal dependent upon the first signal. The interpreter communicates the second signal to the controller.

DETAILED DESCRIPTION OF THE INVENTION

Figure 1:
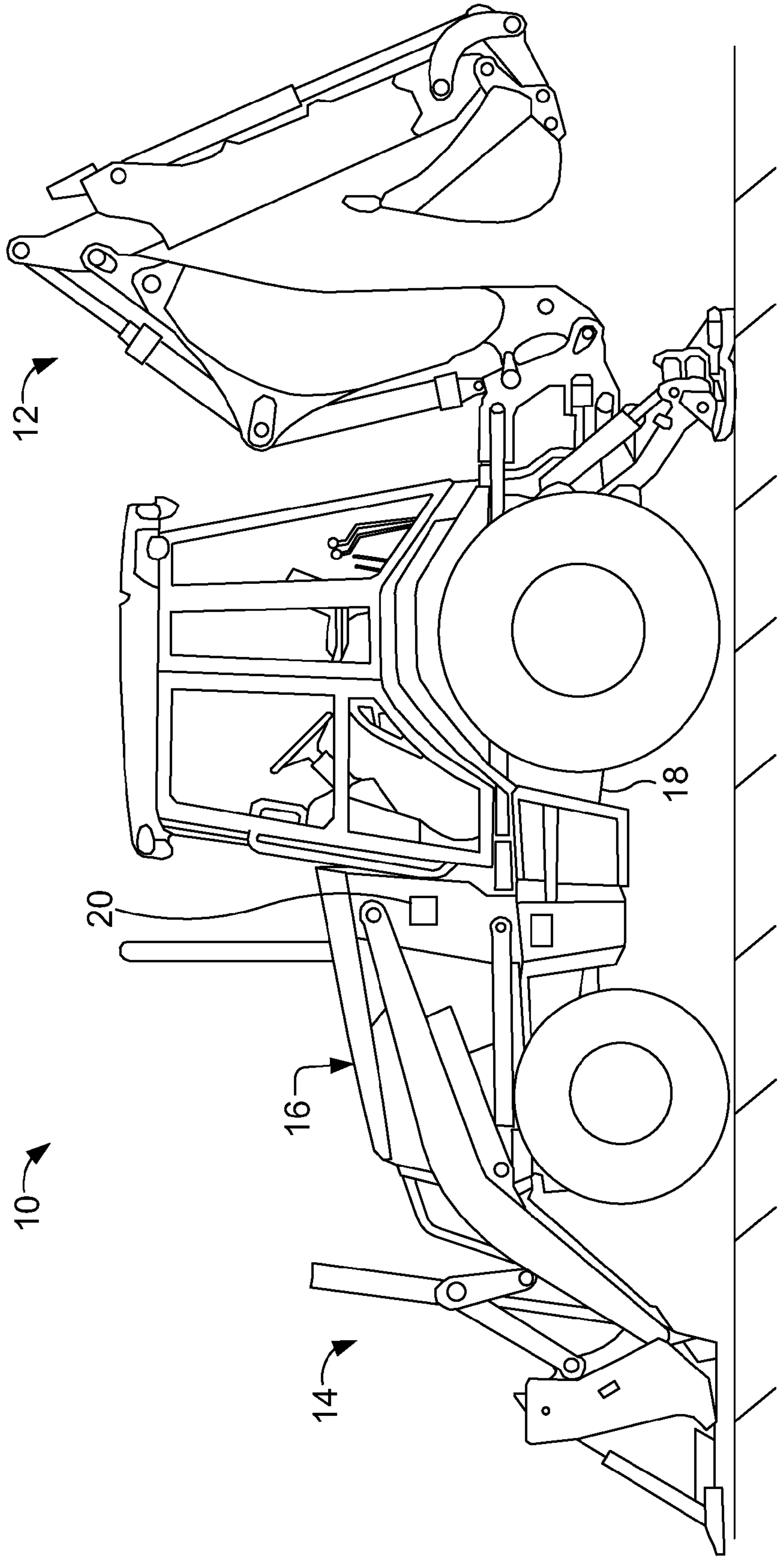
FIG. 1 is a side view of a ground engaging vehicle, in the form of a backhoe/loader that utilizes an embodiment of an engine control system of the present invention.

Referring now to the drawings, and more particularly to FIG. 1, there is shown a backhoe/loader system 10 including a backhoe 12, a loader 14, an engine 16, a frame 18 and a control system 20. Backhoe 12 and loader 14 each have hydraulic actuators that cause the movement of the components therein. Hydraulic power is provided by way of a hydraulic pump, not shown, that is directed by control system 20 based on inputs provided by an operator. Engine 16 provides power to the mechanical movement of system 10 as well as providing operative power to run the hydraulic and electrical systems of system 10. Engine 16 is connected to frame 18. Frame 18 additionally has wheels and other operative elements connected thereto.

Figure 2:
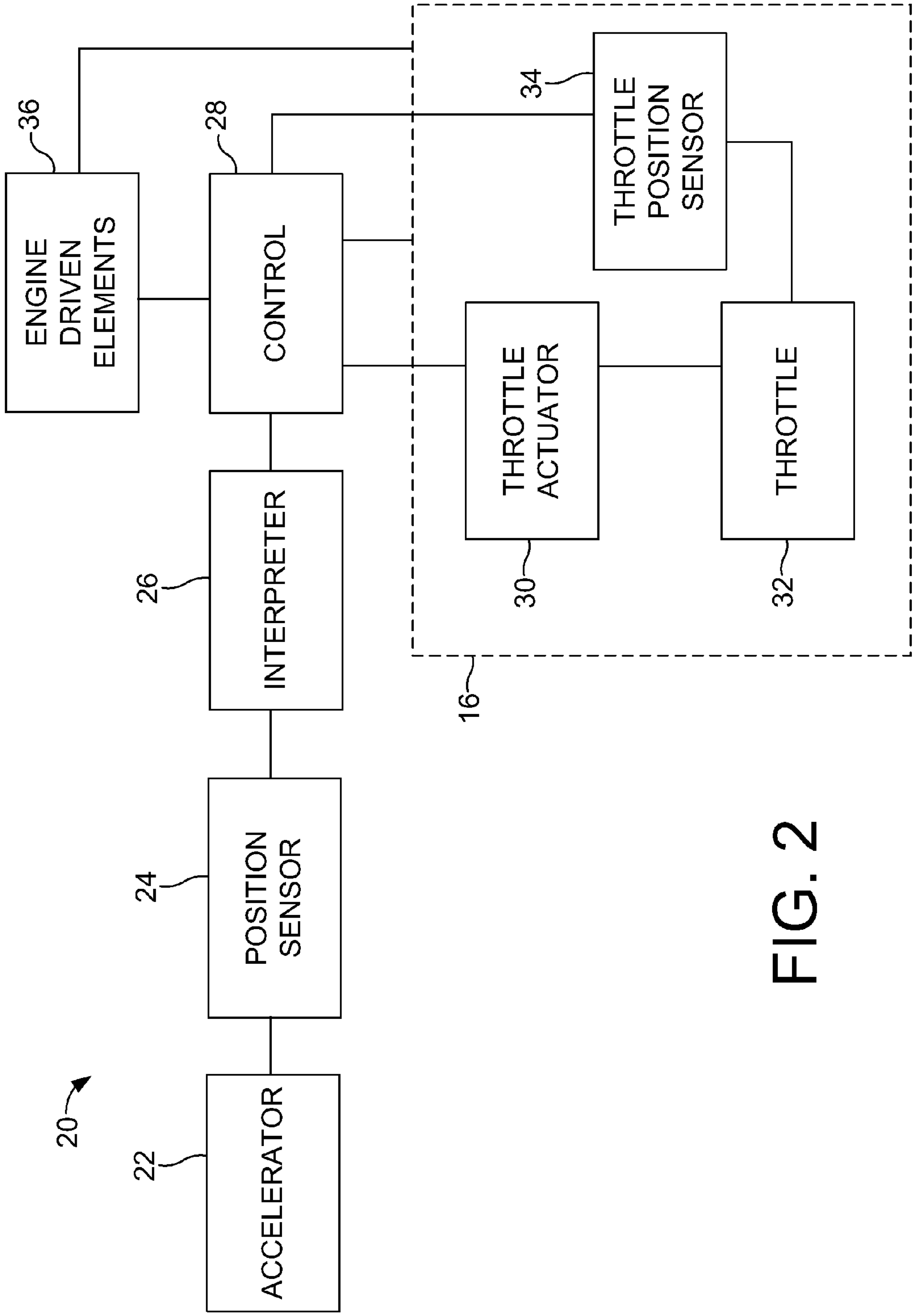
FIG. 2 is a schematical diagram illustrating the interconnection of portions of elements used in the backhoe of FIG. 1.

Now, additionally referring to FIG. 2 there is schematically shown elements of control system 20 including an accelerator 22, a position sensor 24, an interpreter 26, a control 28, a throttle actuator 30, a throttle 32, a throttle position sensor 34, and engine driven elements 36. Control 28 is also known as a controller 28, which is part of a controller area network (CAN). Accelerator 22 may be in the form of pedal or lever and/or a combination thereof that allows the operator to input a desired engine speed of engine 16. Position sensor 24 is associated with accelerator 22 in that the relative position of accelerator 22 is sensed by position sensor 24, which generates a signal that is received by interpreter 26.

Although for the ease of understanding interpreter 26 is illustrated as being separate from control 28, interpreter 26 may be part of control 28 and may be incorporated as an algorithm that functionally receives a signal from position sensor 24. The illustration in FIG. 2 shows interpreter 26 separate from control 28 for ease of illustration and discussion thereof. Interpreter 26 utilizes the signal from position sensor 24 and alters the signal, when necessary, and passes another signal, based on the received signal, to control 28. The reasons for the interpretation or altering of the signal received from position sensor 24 are discussed later. Control 28 is operatively connected to throttle actuator 30 and throttle position sensor 34. Throttle actuator 30, throttle 32 and throttle position sensor 34 are all associated with engine 16. Throttle 32 is the actual metering device that provides fuel and/or airflow to engine 16 thereby altering the speed of engine 16. Throttle actuator 30 physically moves throttle 32 under the control of control 28 by way of a signal or voltage level sent therebetween. Throttle position sensor 34 provides positional information such as a feedback signal to control 28 to ensure that throttle actuator 30 has fully and properly executed the commands received from control 28 for the adjustment of throttle 32.

The responsiveness of throttle 32 to the signal from control 28 by way of throttle actuator 30 is rather immediate since throttle 32 has little inertia or damping to prevent the movement of throttle 32. For purposes of explanation it can be considered that throttle 32 very rapidly assumes its position based on a control signal from control 28. The rapid actuation of throttle 32 is such that it can be operated and positioned to a level that requires a certain larger finite amount of time for engine 16 to respond. The time period involved for engine 16 to fully respond may be on the order of one second, but control of throttle 32 may be positioned in a much shorter time. The rpm of engine 16 is received by control 28 and can be interpreted as lagging the desired rpm as selected by the position of throttle 32. In a prior art system, without an interpreter 26, the desired acceleration is expressed by the operator upon movement of accelerator 22, which is then conveyed to throttle 32. Controller 28 senses the engine speed and computes that the engine is not performing to the level selected by throttle 32 for some short period of time. This can introduce an undesirable error indication and control 28 may shed one or more of the engine driven loads 36, such as the hydraulic system. This occurs because engine 16 is simply not able to respond in the same time frame as the positioning of throttle 32. The present invention provides a solution to this problem as exemplified by the operation of method 100.

Figure 3:
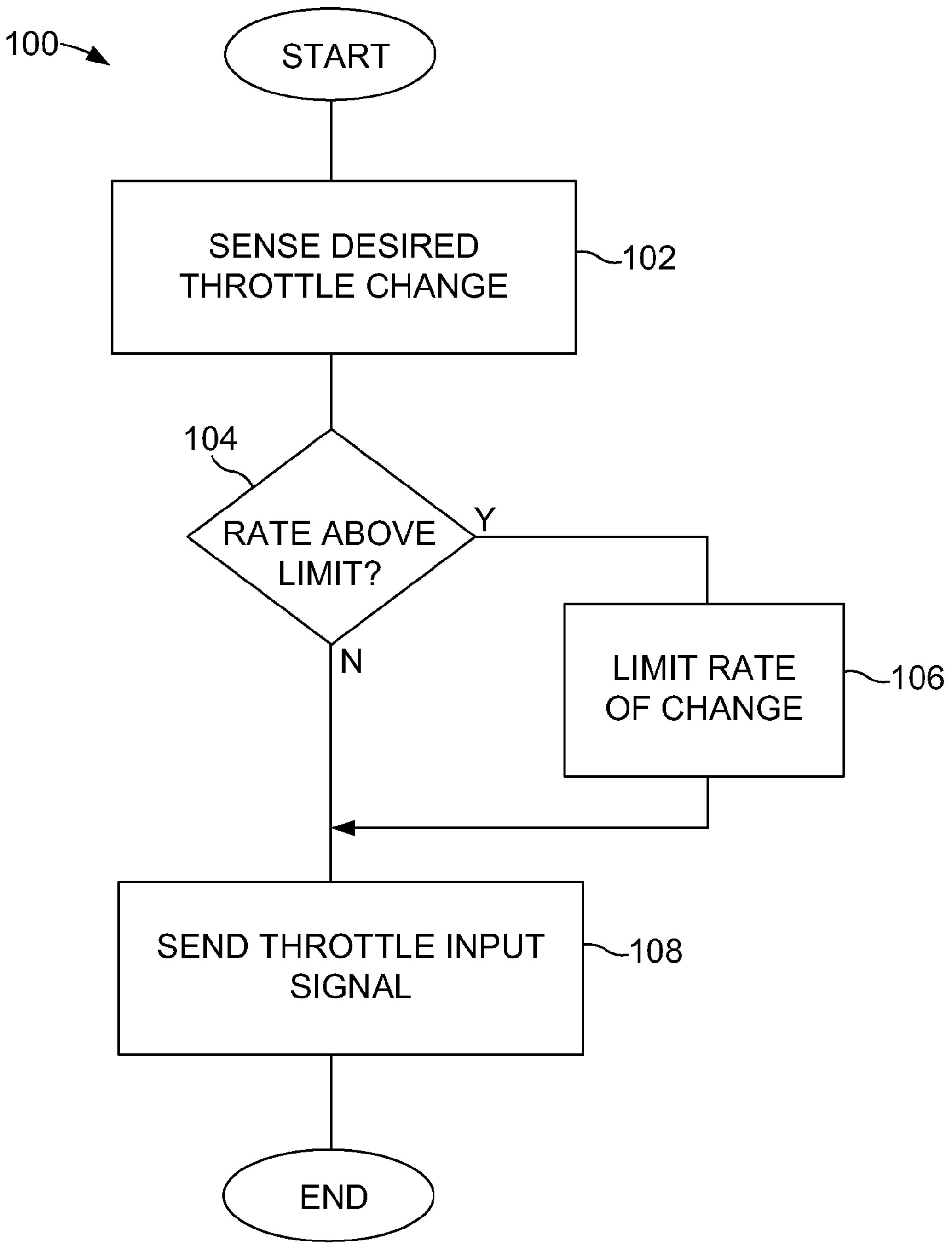
FIG. 3 is a flow chart illustrating operations of an interpreter utilized in the control system of FIG. 2.

Now, additionally referring to FIG. 3 there is illustrated method 100 that is carried out by interpreter 26 by way of electrical circuits and/or as an algorithm contained in and operated within control 28. The signal received from position sensor 24 is sensed at step 102, with the desired throttle change being detected by position sensor 24 and sent to interpreter 26 by way of a first signal. A determination is made at step 104 as to whether the desired rate of change of throttle 32 is above a predetermined limit. The predetermined limit approximates the capabilities of engine 16 in a no-load situation. If a desired rate of change is above the predetermined limit then the rate of change of the signal is limited at step 106. If the desired rate of change is not above the limit then the signal received by interpreter 26 may pass to control 28 a signal that is unaltered. At step 108 the second signal is sent from interpreter 26 that is dependent upon the signal received from position sensor 24. The signal sent at step 108 may be a continuously increasing signal until the desired throttle change is achieved. This procedure advantageously does not alter the functioning of engine 16 since engine 16 is then simply responding along a performance curve that is reflective of its ability to change speed under a no-load situation. This allows the sensing and control mechanism, associated with control 28, to accurately track the performance of engine 16 to ensure that loads are not unnecessarily shed due to the response of engine 16 to a very fast change in desired engine speed evoked by the operator. Interpreter 26 functions to alter the signal sent to controller 28 during rapid changes of input from accelerator 22, whether the input reflects a requested increase or decrease in engine speed.

Figure 4:
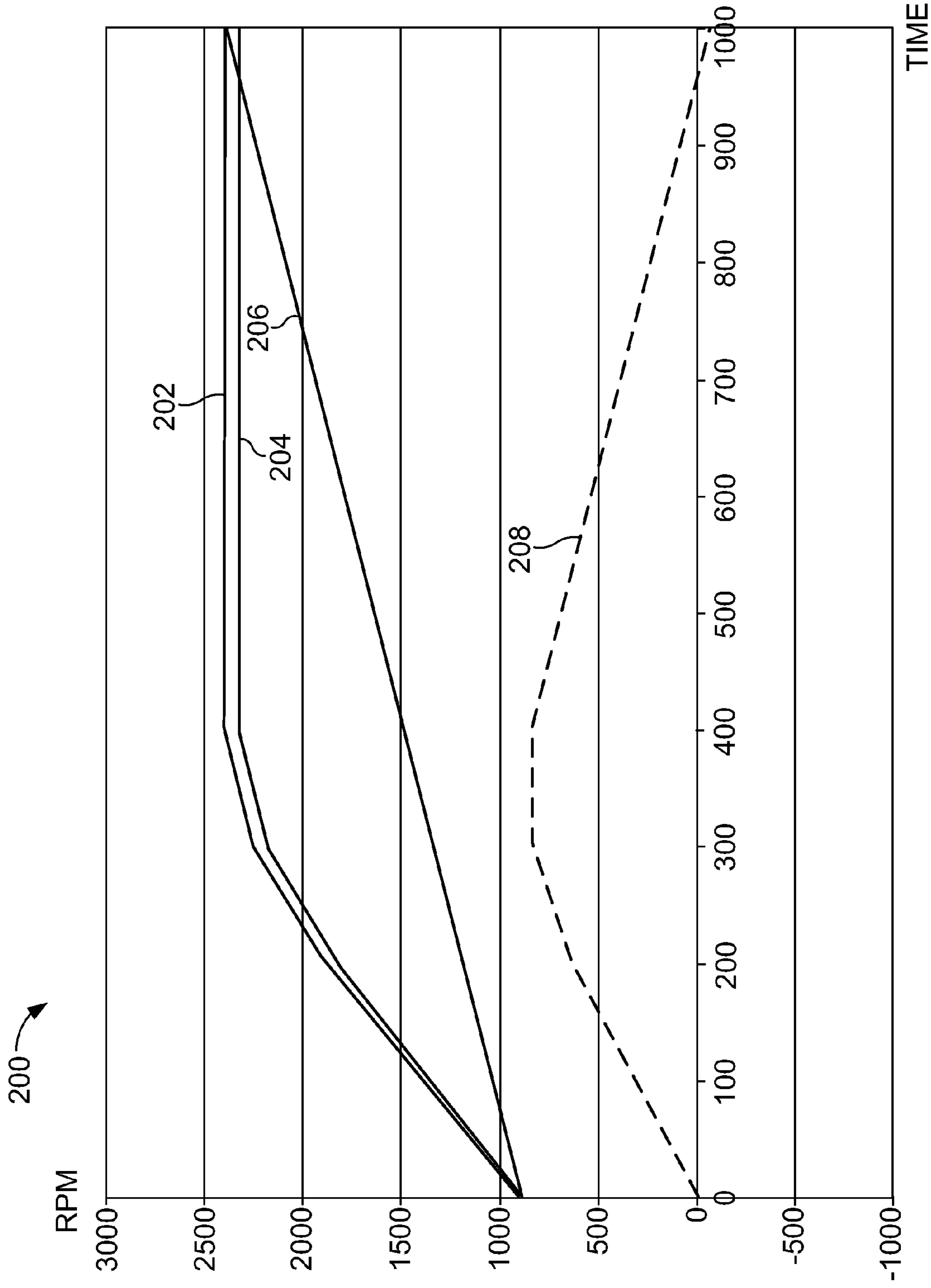
FIG. 4 is a chart that illustrates engine performance.

Now, additionally referring to FIG. 4 there is illustrated the performance characteristics of the engine without the use of interpreter 26 in the form of a chart 200. In chart 200, line 202 represents a detected input by the operator resulting in a signal from a position sensor (similar to position sensor 24 of the present invention) indicating a desired increase in the rpm of the engine. Responsive thereto, a controller (similar to controller 28 of the present invention) issues a signal altering a throttle, which is represented by line 204, which largely tracks the input represented by line 202. The response of the engine is represented by line 206 and although substantially linear may be curvilinear or with some other shape. For ease of illustration line 206 is linear so that the responsiveness of engine 16 from an initial rpm of approximately 800 to approximately 2400 is accomplished over approximately 1000 milliseconds. During the response time the difference between the desired rpm, represented by line 204, and the actual rpm, represented by line 206, is an error signal illustrated here as line 208. Error signal 208 is calculated by control 28 and is responded thereto by an interpretation that engine 16 may be overloaded since the engine rpm is different, by a significant amount, from the desired rpm. This may result in the undesired load shedding of systems or other undesirable responses over this brief period of time. After the error signal is substantially zero the load may then be reintroduced to the engine. This causes unnecessary intervention by a control 28, since in the illustrated example a response by engine 16 along line 206 is proximate to the unloaded capability of engine 16. An alternative to the generally linear input may include a knee in the curve, which can lead to an improved response and less of a mid rise pause in the engine performance.

Figure 5:
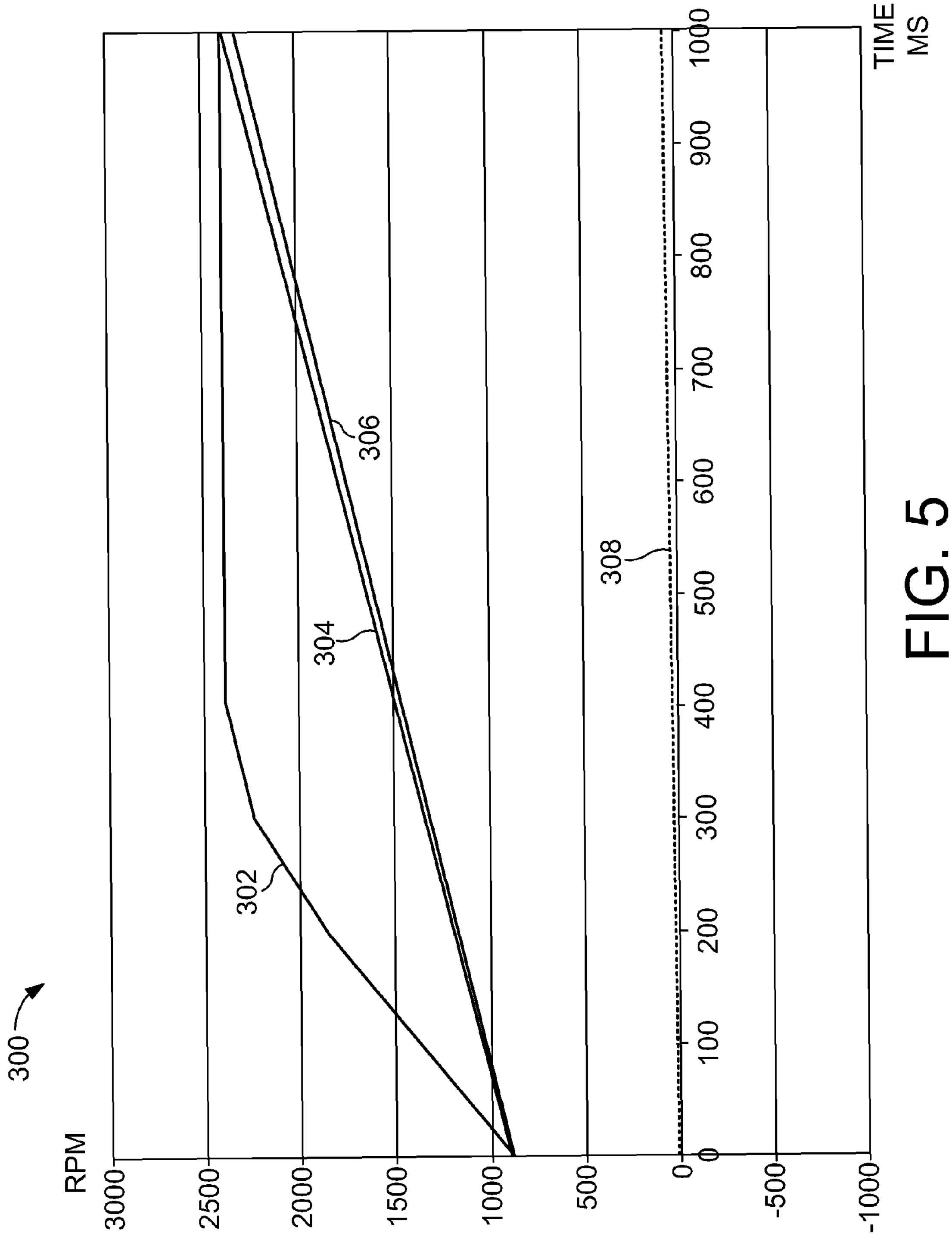
FIG. 5 is another chart illustrating engine performance of the present invention.

Now, additionally referring to FIG. 5 there is illustrated a chart 300 that illustrates the use of interpreter 26 and method 100. In chart 300, line 302 is substantially similar to line 202 in the previous chart and illustrates the desired engine rpm as input by the operator. Interpreter 26 receives the signal from position sensor 24, represented as line 302 reinterprets a signal or modifies the signal so that the signal sent from interpreter 26 is represented by line 304 and is received by controller 28. The response of engine 16 is illustrated as line 206 a difference between line 304 and 306 generating an error signal 308, which is very minimal, which allows the load shedding algorithms contained in control 28 to more properly respond since the response of engine 16 is substantially similar or close to the desired response conveyed to throttle 32. This solution illustrates the limiting of the throttle input signal to the control algorithm of control 28 at a rate similar to that of a step response for an engine 16 having no load. This allows a comparison between the commanded engine speed and the engine response, as represented by the engine speed, which is representative of the engine capability. If there really is a significant load on engine 16, the load on engine 16 will pull down line 306 to thereby increase error signal 308 thereby allowing the power control algorithm to react appropriately.

A further embodiment of a control is to have an engine simulation model running in parallel with the control system, even a simplified model. The simulation could either be run in the engine control unit with the pertinent information broadcast to the controller managing the hydraulic power control, or the engine model could run inside of a hydraulic power control system. This would provide robust engine response information and also be adaptive to a variety of real-time operating condition changes like load, ambient temperature, engine temperature, fuel pressure, derated state, particulate filter regeneration needs, or other environmental variables which could change the engine response from nominal. This technique would not then depend on an anticipated linear response by the engine as discussed above.

Advantages of the present invention include the elimination of false heavy engine load indications by the power control algorithm. Another advantage is that pauses in loader and/or backhoe hydraulic functions that may be caused by a step input command on the accelerator are eliminated. Yet another advantage of the present invention that delays on the initiation of hydraulics or other systems are eliminated when an auto-idle function is enabled, thereby allowing the conservation of fuel without the introduction of an improper error response. Yet another advantage of the present invention is that throttle position is more accurately tracked to the performance capability of the engine and prevents oversupply of fuel as the engine is increasing its rpm.

Having described the preferred embodiment, it will become apparent that various modifications can be made without departing from the scope of the invention as defined in the accompanying claims.

The invention claimed is:

1. A ground engaging vehicle, comprising:

a frame;

an engine supported by said frame, said engine operable at a rotational speed, said engine including a throttle;

a controller in communication with said engine;

an accelerator;

a position sensor associated with said accelerator, said position sensor generating a first signal corresponding to a position of said accelerator; and an interpreter receiving said first signal from said position sensor, said interpreter generating a second signal dependent on said first signal from said position sensor, said interpreter detecting a change in said first signal from said position sensor and communicating said second signal to said controller, said second signal being said first signal modified to not exceed a predetermined rate of change of said engine speed.

2. The ground engaging vehicle of claim 1, wherein said interpreter generates said second signal by being additionally dependent upon a rate limiting algorithm.

3. The ground engaging vehicle of claim 2, wherein said rate limiting algorithm limits said second signal to approximate a maximum engine speed of said engine.

4. The ground engaging vehicle of claim 3, wherein said maximum engine speed approximates a response of said engine with no load thereon.

5. The ground engaging vehicle of claim 1, further comprising:

a throttle actuator connected to said throttle to position said throttle, said throttle actuator communicatively connected to said controller; and a power control algorithm utilized by said controller to send a third signal to said throttle actuator, said interpreter being a rate limiting algorithm that generates said second signal dependant upon a rate limiting function.

6. The ground engaging vehicle of claim 5, wherein said rate limiting function approximates a maximum engine speed of said engine.

7. The ground engaging vehicle of claim 6, wherein said maximum speed function approximates a response of said engine with no load thereon.

8. The ground engaging vehicle of claim 5, wherein said rate limiting algorithm is contained within said controller.

9. The ground engaging vehicle of claim 8, wherein said second signal is in the form of data generated by said rate limiting algorithm that is used by said power control algorithm.

10. The ground engaging vehicle of claim 9, wherein said data is offset by a predetermined value from said rate limiting function.

11. An engine control system for a ground engaging vehicle, comprising:

an engine including a throttle, said engine operable at a rotational speed, said engine capable of changing speed at a predetermined rate;

a controller in communication with said engine;

an accelerator;

a position sensor associated with said accelerator, said position sensor generating a first signal corresponding to a position of said accelerator; and an interpreter receiving said first signal from said position sensor, said interpreter decreasing said first signal from said position sensor to a second signal based on said predetermined rate of engine speed, said interpreter communicating said second signal to said controller.

12. The engine control system of claim 11, wherein said interpreter generates said second signal by being additionally dependent upon a rate limiting algorithm.

13. The engine control system of claim 12, wherein said rate limiting algorithm limits said second signal to approximate a maximum engine speed of said engine.

14. The engine control system of claim 13, wherein said maximum engine speed approximates a response of said engine with no load thereon.

15. The engine control system of claim 11, further comprising:

a throttle actuator connected to said throttle to position said throttle, said throttle actuator communicatively connected to said controller; and a power control algorithm utilized by said controller to send a third signal to said throttle actuator, said interpreter being a rate limiting algorithm that generates said second signal dependant upon a rate limiting function.

16. The engine control system of claim 15, wherein said rate limiting function approximates a maximum engine speed of said engine.

17. The engine control system of claim 16, wherein said maximum engine speed approximates a response of said engine with no load thereon.

18. The engine control system of claim 15, wherein said rate limiting algorithm is contained within said controller.

19. The engine control system of claim 18, wherein said second signal is in the form of data generated by said rate limiting algorithm that is used by said power control algorithm.

20. The engine control system of claim 19, wherein said data is offset by a predetermined value from said rate limiting function.

21. The ground engaging vehicle of claim 1, wherein said controller uses said second signal to control said throttle.

22. A ground engaging vehicle, comprising:

a frame;

an engine supported by said frame, said engine capable of changing speed at a predetermined rate;

an accelerator that receives an input to change the engine speed at a desired rate;

an interpreter that performs the steps of:

receiving a desired throttle input signal based on the input to the accelerator; and limiting the desired throttle input signal to an actual throttle input signal when the desired rate of engine speed from the accelerator exceeds the predetermined rate of engine speed from the engine; and a throttle that controls the engine speed based on the actual throttle input signal.

23. The ground engaging vehicle of claim 22, wherein, based on the actual throttle input signal, the throttle changes the engine speed at the predetermined rate, which is slower than the desired rate.

* * * * *